US012076838B2

(12) United States Patent
Abel et al.

(10) Patent No.: US 12,076,838 B2
(45) Date of Patent: Sep. 3, 2024

(54) SCREWDRIVER TOOL WITH A GEAR RATIO

(71) Applicant: Wera Werkzeuge GmbH, Wuppertal (DE)

(72) Inventors: Michael Abel, Radevormwald (DE); Max Steinmetz, Wuppertal (DE)

(73) Assignee: WERA WERKZEUGE GMBH, Wuppertal (DE)

( * ) Notice: Subject to any disclaimer, the term of this patent is extended or adjusted under 35 U.S.C. 154(b) by 464 days.

(21) Appl. No.: 17/426,703

(22) PCT Filed: Feb. 3, 2020

(86) PCT No.: PCT/EP2020/052584
§ 371 (c)(1),
(2) Date: Jul. 29, 2021

(87) PCT Pub. No.: WO2020/161059
PCT Pub. Date: Aug. 13, 2020

(65) Prior Publication Data

US 2022/0097214 A1 Mar. 31, 2022

(30) Foreign Application Priority Data

Feb. 4, 2019 (DE) ..................... 10 2019 102 667.9

(51) Int. Cl.
*B25B 15/04* (2006.01)
*B25B 17/02* (2006.01)

(52) U.S. Cl.
CPC .............. *B25B 15/04* (2013.01); *B25B 17/02* (2013.01)

(58) Field of Classification Search
CPC ......... B23Q 5/048; B25B 17/02; B25B 15/04; B25B 15/06; B25B 19/00
See application file for complete search history.

(56) References Cited

U.S. PATENT DOCUMENTS

| | | | | |
|---|---|---|---|---|
| 7,585,126 | B2 * | 9/2009 | Ling | F16B 19/109 403/348 |
| 8,468,914 | B2 * | 6/2013 | Gauthier | B25B 23/0035 81/60 |

(Continued)

FOREIGN PATENT DOCUMENTS

| | | | |
|---|---|---|---|
| CN | 108789255 | A | 11/2018 |
| DE | 2307186 | A1 | 8/1974 |

(Continued)

OTHER PUBLICATIONS

International Search Report and Written Opinion of the International Searching Authority; Application No. PCT/EP2020/052584; Completed: Aug. 11, 2020; Mailing Date: Aug. 19, 2020; 10 Pages.

*Primary Examiner* — David B. Thomas
(74) *Attorney, Agent, or Firm* — Whitmyer IP Group LLC

(57) ABSTRACT

A screwdriver tool including a gear ratio arranged in a handle for multiplying a rotation angle transmitted from the hand to a blade protruding from the handle. A blocking element can be rotated from a release position, in which a first handle section can be rotated relative to a second handle section for the purpose of quick-action screwing, into a blocking position, in which a blocking element secures the blade to the handle in a rotationally fixed manner. The switching between the release position and the blocking position occurs by means of a push-button arranged in the tip of the handle, which is moved back into its starting position in a spring-loaded manner after being actuated.

15 Claims, 7 Drawing Sheets

(56) References Cited

U.S. PATENT DOCUMENTS

| | | | | |
|---|---|---|---|---|
| 9,156,145 | B2 * | 10/2015 | Wang | B25B 17/00 |
| 9,216,496 | B2 * | 12/2015 | Gauthier | B25B 15/02 |
| 9,927,004 | B2 * | 3/2018 | Gao | F16H 1/28 |
| 10,022,846 | B2 | 7/2018 | Wang | |
| 10,343,265 | B2 * | 7/2019 | Daly | B25B 23/0007 |
| 10,427,275 | B2 * | 10/2019 | Gauthier | B25B 23/0035 |
| 10,589,405 | B2 * | 3/2020 | Wang | B25B 17/00 |
| 10,654,152 | B2 * | 5/2020 | Xiong | B25B 17/00 |
| 2003/0005794 | A1 * | 1/2003 | Shih | B25G 1/085<br>81/57.31 |

FOREIGN PATENT DOCUMENTS

| | | | | |
|---|---|---|---|---|
| DE | 3500127 | A1 * | 7/1986 | B25B 17/00 |
| WO | 2004014609 | A2 | 2/2004 | |
| WO | 2011099654 | A1 | 8/2011 | |
| WO | 2016028727 | A1 | 2/2016 | |

* cited by examiner

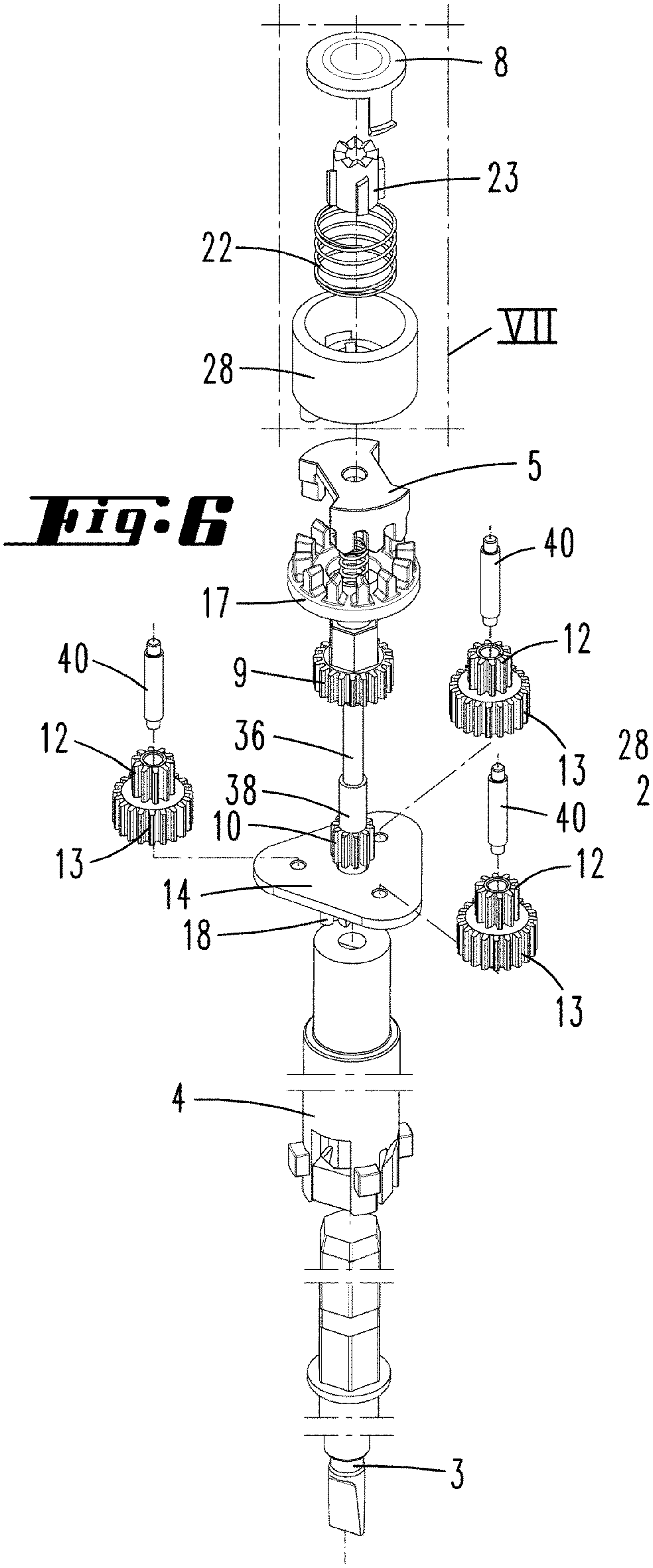
Fig. 6
Fig. 7
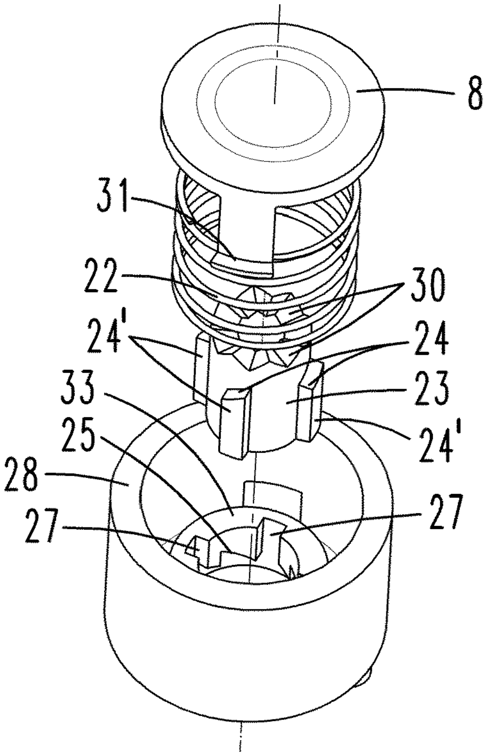

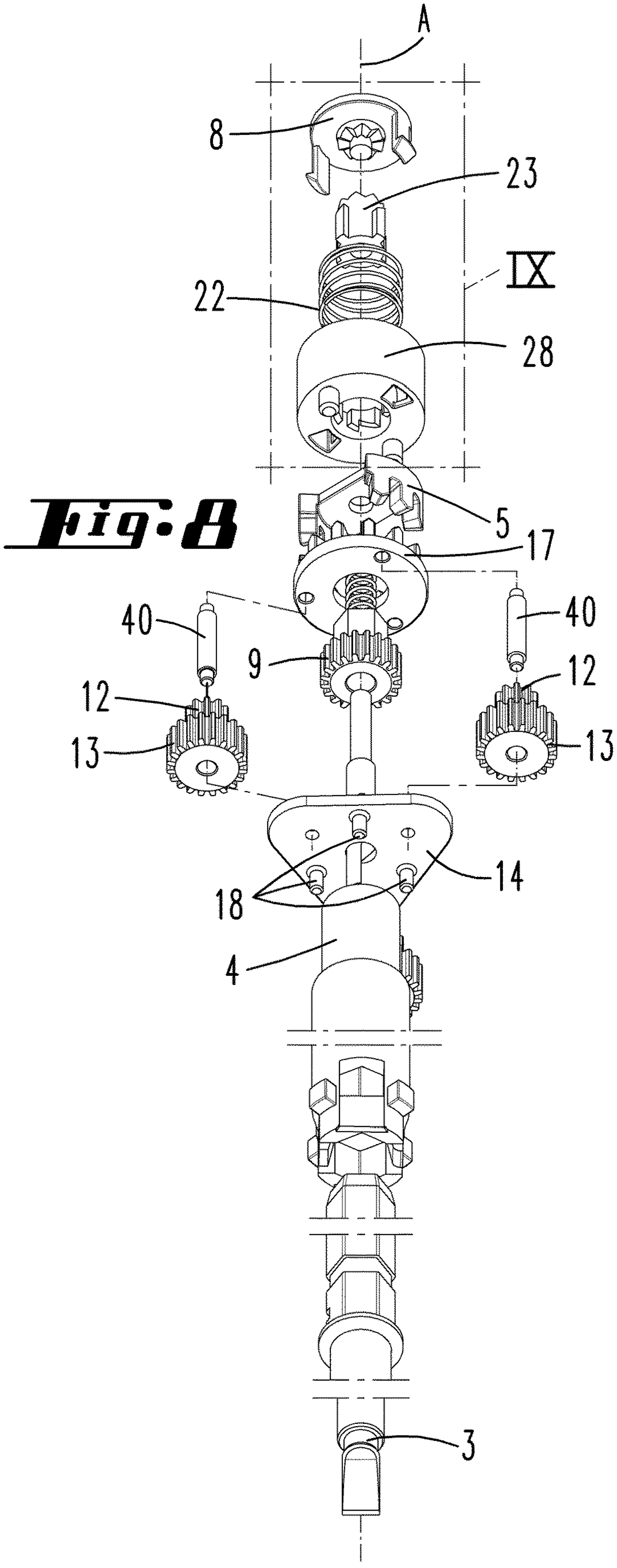
Fig. 8
Fig. 9
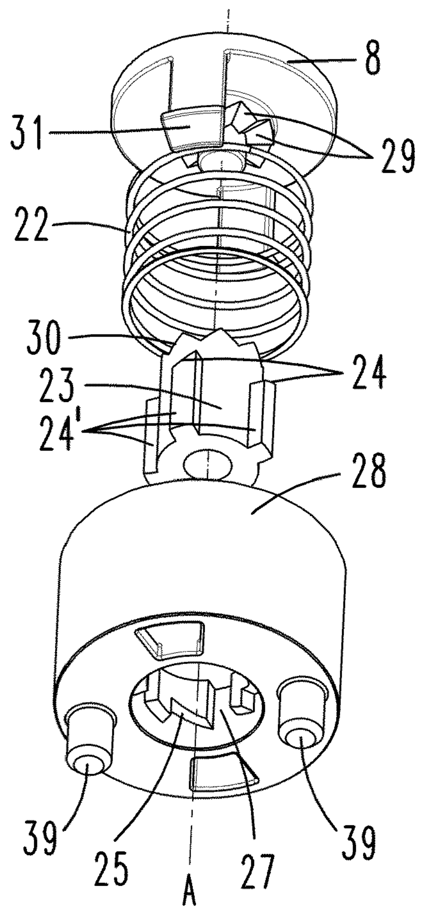

SCREWDRIVER TOOL WITH A GEAR RATIO

TECHNICAL FIELD

The invention pertains to a screwdriver tool with a transmission gearing, which is arranged in a handle and serves for multiplying a rotation angle transmitted from the handle to a blade protruding from the handle or to a chuck for receiving a blade, and with a locking means.

BACKGROUND

A screwdriver tool of this type is known from DE 35 00 127. The screwdriver tool described in this publication has a handle that consists of two handle sections. An epicyclic gearing is located in a handle section facing a blade and makes it possible to convert a rotary motion of the handle into a rotary motion of the blade in such a way that the rotational speed is increased. Furthermore, a locking mechanism is located within the handle in order to switch between counterclockwise-clockwise rotation.

SUMMARY

The invention is based on the objective of advantageously enhancing the initially cited screwdriver tool with respect to its use.

This objective is attained with the invention specified in the claims. The dependent claims not only represent advantageous enhancements of the technical disclosure specified in the main claim, but also independent solutions of the objective. The characteristics of the dependent claims can be arbitrarily combined with one another.

It is initially and essentially proposed that the screwdriver tool has a blocking element. The blocking element can be displaced from a release position, in which the transmission gearing is active, into a blocking position, in which the transmission gearing is no longer active. In the release position, a rotation angle applied to the handle is respectively transmitted to the blade or the chuck for receiving the blade by the transmission gearing in such a way that the rotation angle is increased. In the blocking position, the blade or the chuck is respectively secured to the handle in a rotationally fixed manner. The inventive screwdriver tool may have two handle sections that can be rotated relative to one another in the release position of the blocking element and are secured to one another in a kinematically fixed manner in the blocking position of the blocking element. It is particularly proposed that the blocking element can be displaced axially referred to an extending direction of the handle or the blade. The two handle sections may consist of one part or multiple parts. They may particularly consist of multiple interconnected parts. It is particularly proposed that the first handle section consists of two parts that are axially connected to one another. The blocking element may be displaceably assigned to the handle section facing away from the blade and arranged, in particular, in the region of the end face of the handle, wherein the end face of the handle body forming the second handle section has a corresponding face side opening, in which a pushbutton for displacing the blocking element is arranged, particularly inserted. In a preferred embodiment, the pushbutton can be displaced against the elastic restoring force of a pushbutton spring. The pushbutton preferably is realized in the form of a button that once again returns into its starting position, in which it lies flushly in the particularly curved face side of the handle section, after each actuation from the starting position that respectively involves an elastic deformation of the pushbutton spring. Each actuation of the pushbutton leads to a displacement of the blocking element, wherein a first actuation displaces the blocking element from the release position into the blocking position, in which it is then held with the aid of a holding means as described further below. A second actuation of the pushbutton leads to a release of the holding means and to a return displacement of the blocking element from the blocking position into the release position. To this end, the blocking element is acted upon by a blocking element spring, which acts upon the blocking element from the blocking position in the direction of the release position. In a preferred embodiment, the transmission gearing is realized in the form of an epicyclic gearing. The reduction gearing preferably has two gearing planes. A first toothed wheel, particularly a sun wheel with a large-diameter toothing, is located in a first gearing plane. This large-diameter toothed wheel meshes with small-diameter toothings of second toothed wheels, particularly planetary wheels. The small-diameter toothings of the second toothed wheels are connected in a rotationally fixed manner to large-diameter toothings of the second toothed wheels that lie in a second plane, in which a third toothed wheel, particularly a second small-diameter sun wheel, is arranged. The large-diameter toothed wheel is connected to the handle section facing away from the blade in a rotationally fixed manner. To this end, the large-diameter first toothed wheel may have a coupling section, which particularly is realized in the form of a polygon and engages into a fittingly shaped cavity of the first handle section such that the coupling section is connected to the first handle section in a rotationally fixed manner. The third toothed wheel, particularly the small-diameter sun wheel, is connected in a rotationally fixed manner to the blade, a chuck or a driving extension that can transmit a torque to the blade. The third toothed wheel, particularly the small-diameter sun wheel, may be connected to a driving axle that in turn is connected to a chuck. It is particularly proposed that the second toothed wheels are planetary wheels, and that a web carrying the second toothed wheels is connected in a rotationally fixed manner to a second handle section, which is rotatable relative to the first handle section in the release position of the blocking element. When the second handle section near the blade is held firmly by a hand of a user, e.g. the left hand, the second toothed wheels, particularly the planetary wheels, assume a stationary gearing position. A rotary motion transmitted from the first handle section to the second toothed wheels, particularly the planetary wheels, via the large-diameter toothed wheel, particularly the sun wheel, is transmitted to the third toothed wheel, particularly the small sun wheel that is respectively connected to the chuck or the blade, for example, with a factor 1:4 such that a rotation angle, which is increased by the factor 4, is respectively transmitted to the blade or the chuck during a rotation of the handle. The handle section located distant from the blade can in the release position be rotated counterclockwise, as well as clockwise, by the other hand of the user, particularly the right hand. The blade then respectively rotates in the same rotating direction with increased rotational speed. The thusly designed screwdriver is particularly suitable for quick-action screwing of screws with metric thread. Such screws are used in electrical installation technology such that the screwdriver tool is in a preferred embodiment realized in the form of a VDE screwdriver tool, in which the chuck and the handle sections are made of an electrically insulating material, particularly plastic. The blade inserted into the chuck has a steel core that is surrounded by an electrically insulating casing, from which only the working tip of the screwdriver tool protrudes. The toothed wheels of the transmission gearing may consist of plastic, but also of metal. If the toothed wheels consist of metal, they may be encapsulated by the handle in an electrically insulating manner. In order to meet VDE requirements, however, it basically suffices to completely encase the blade in plastic and to realize the chuck in such a way that only such plastic-encased blades can be inserted therein. The two handle sections may then also be made of different materials.

According to an enhancement of the invention, it is proposed that the blocking element, which preferably can be displaced axially, is assigned to the first handle section. The blocking element may have a toothing that comprises at least one tooth or at least one tooth space. The toothing may be a broad toothing or a face side toothing, but also a circumferential toothing. In the blocking position, this toothing engages into a mating toothing that comprises at least one tooth space or at least one tooth. The mating toothing preferably is assigned to the second handle section in a rotationally fixed manner and/or to the web of the epicyclic gearing in a rotationally fixed manner. It is particularly proposed that the planetary wheels extend between a ring body forming the mating toothing and the web, wherein the axles of the planetary wheels engage into bearing openings of the ring body and the web. The web may be formed by a plate that carries multiple planetary wheels. The plate may be connected to an extension of the second handle section by means of pins. The pins may be integrally formed on the plate and consist of the same material. However, they may also be formed by the axles of the planetary wheels. The extension engages into a cavity of the first handle section and is rotatably supported therein. The end of the extension may have hooks that engage in the first handle section. When the blocking element is in a release position, the pushbutton displaces the blocking element into a blocking position upon a first actuation. The blocking element is held in this blocking position by means of the switching element. The switching element is held in the displaced position with the aid of holding means. This is preferably realized by means of holding projections of the switching element, which engage underneath holding shoulders, for example, of a crank piece that is inserted into the face opening of the first handle section and also carries the pushbutton. The crank piece may have guide grooves for guiding guide ribs of the switching elements. The ends of the guide ribs pointing toward the pushbutton form holding projections. The ribs move out of the guide grooves upon a sufficient axial displacement of the switching element. Since the pushbutton transmits a torque to the switching element while it acts upon the switching element, the switching element can turn by a rotation angle, at which the holding projections engage underneath holding shoulders of the crank piece. During a second actuation, the pushbutton once again exerts a torque upon the switching element such that the switching element is additionally rotated until it reaches a rotational position, in which the ribs are once again aligned with the guide grooves, and the switching element is displaced back into its starting position. This involves a displacement of the blocking element from the blocking position, wherein the toothing of the blocking element disengages from the mating toothing. The facing end faces of the pushbutton and the switching element form obliquely toothed sections in order to apply the torque.

BRIEF DESCRIPTION OF THE DRAWINGS

An exemplary embodiment of the invention is described below with reference to the attached drawings. In these drawings:

FIG. 6 shows a first exploded view of the essential gearing elements, FIG. 7 shows the enlarged detail VII in FIG. 6, FIG. 8 shows a second a perspective view, and FIG. 9 shows the enlarged detail IX in FIG. 8.

DETAILED DESCRIPTION

Figure 1:
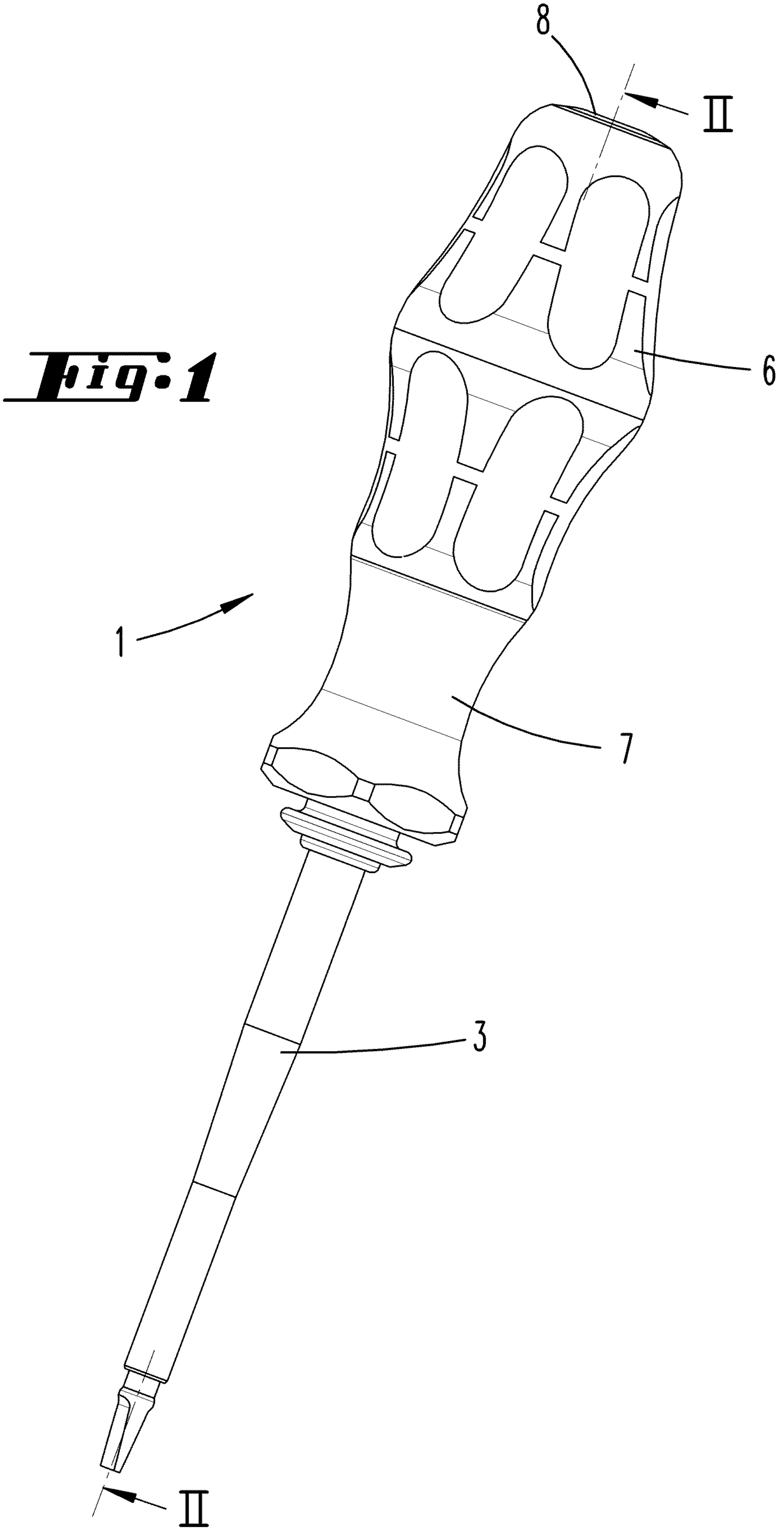
FIG. 1 shows the view of an exemplary embodiment of the invention.
Figure 2:
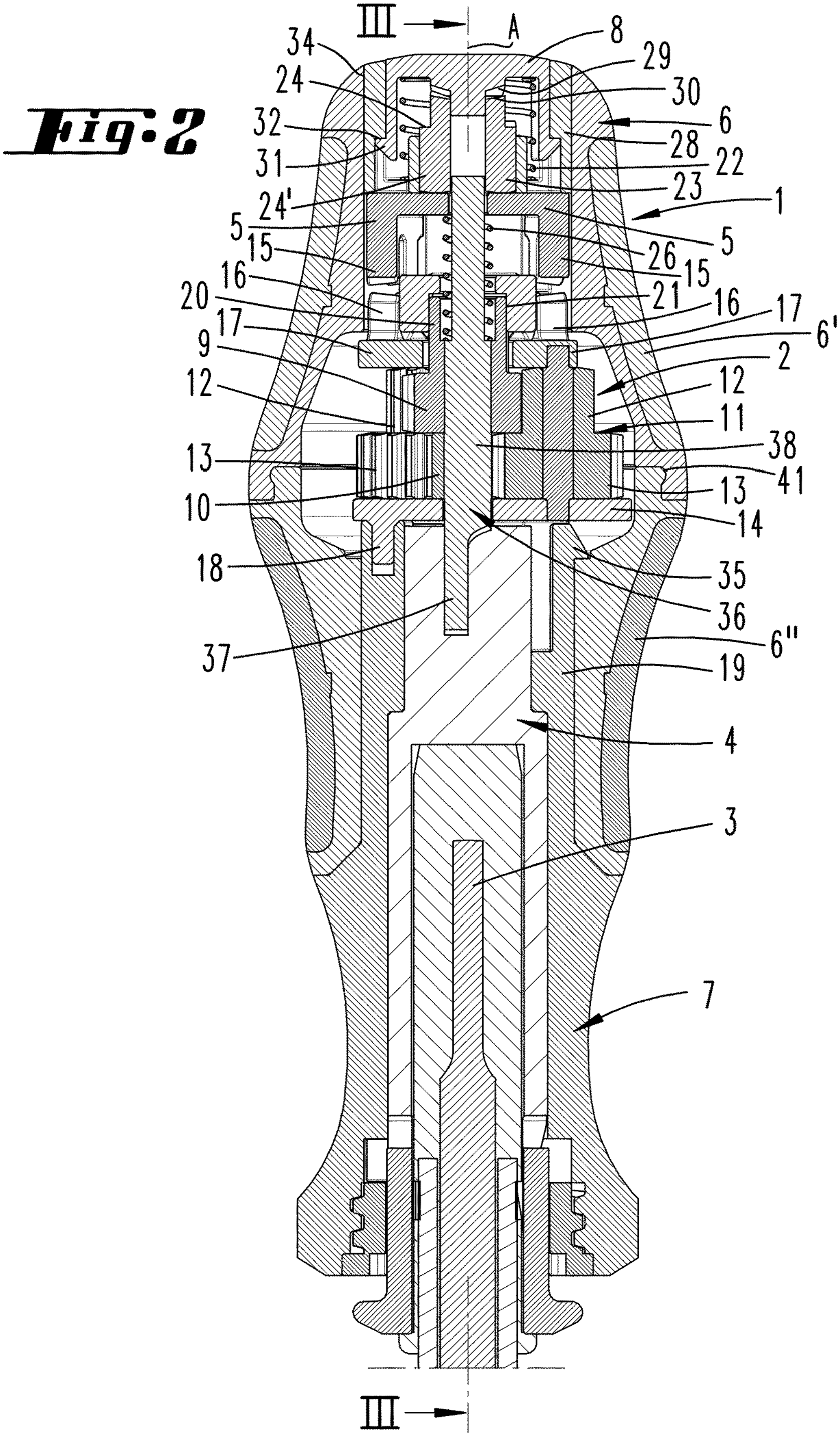
FIG. 2 shows the section along the line II-II in FIG. 1.
Figure 3:
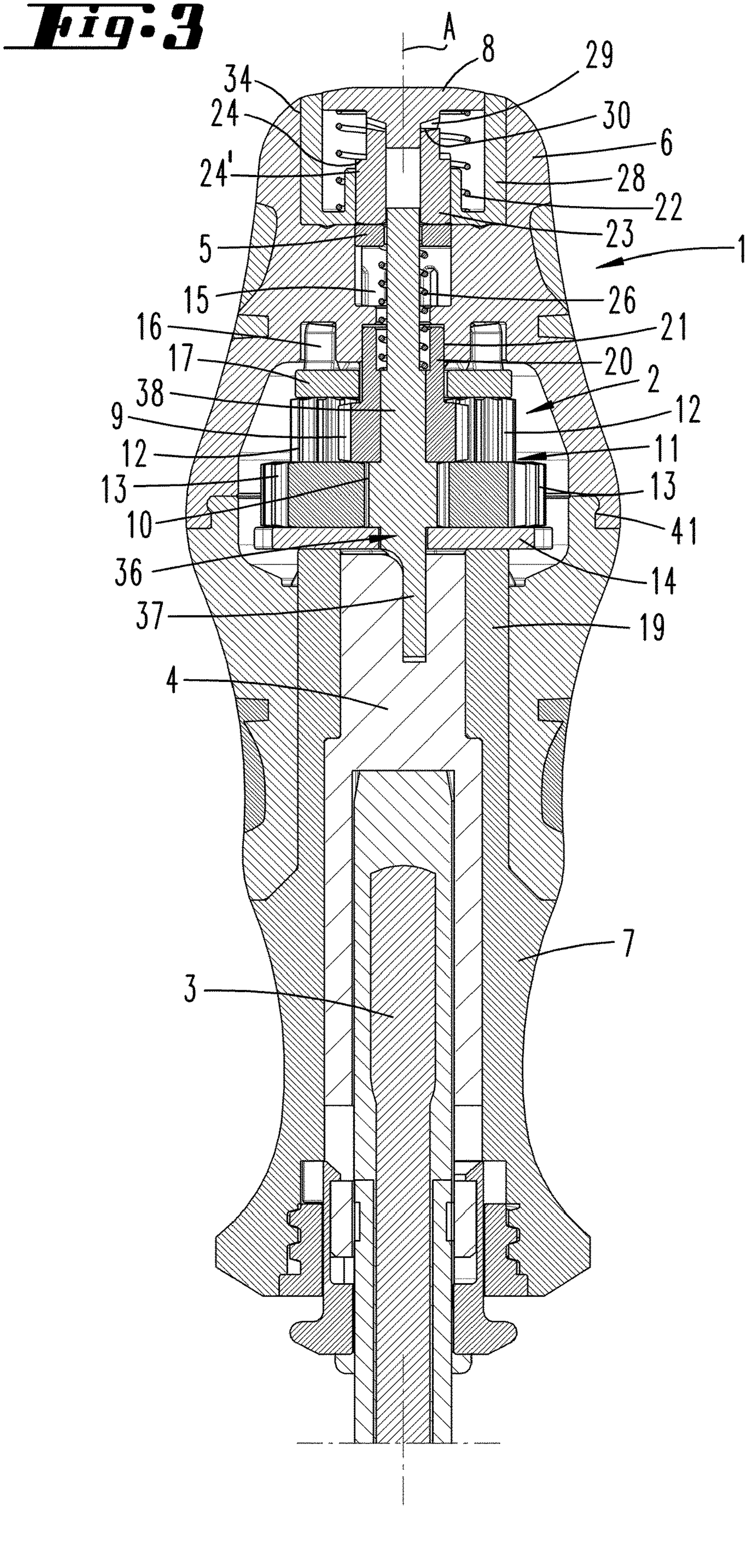
FIG. 3 shows the section along the line III-III in FIG. 2.
Figure 4:
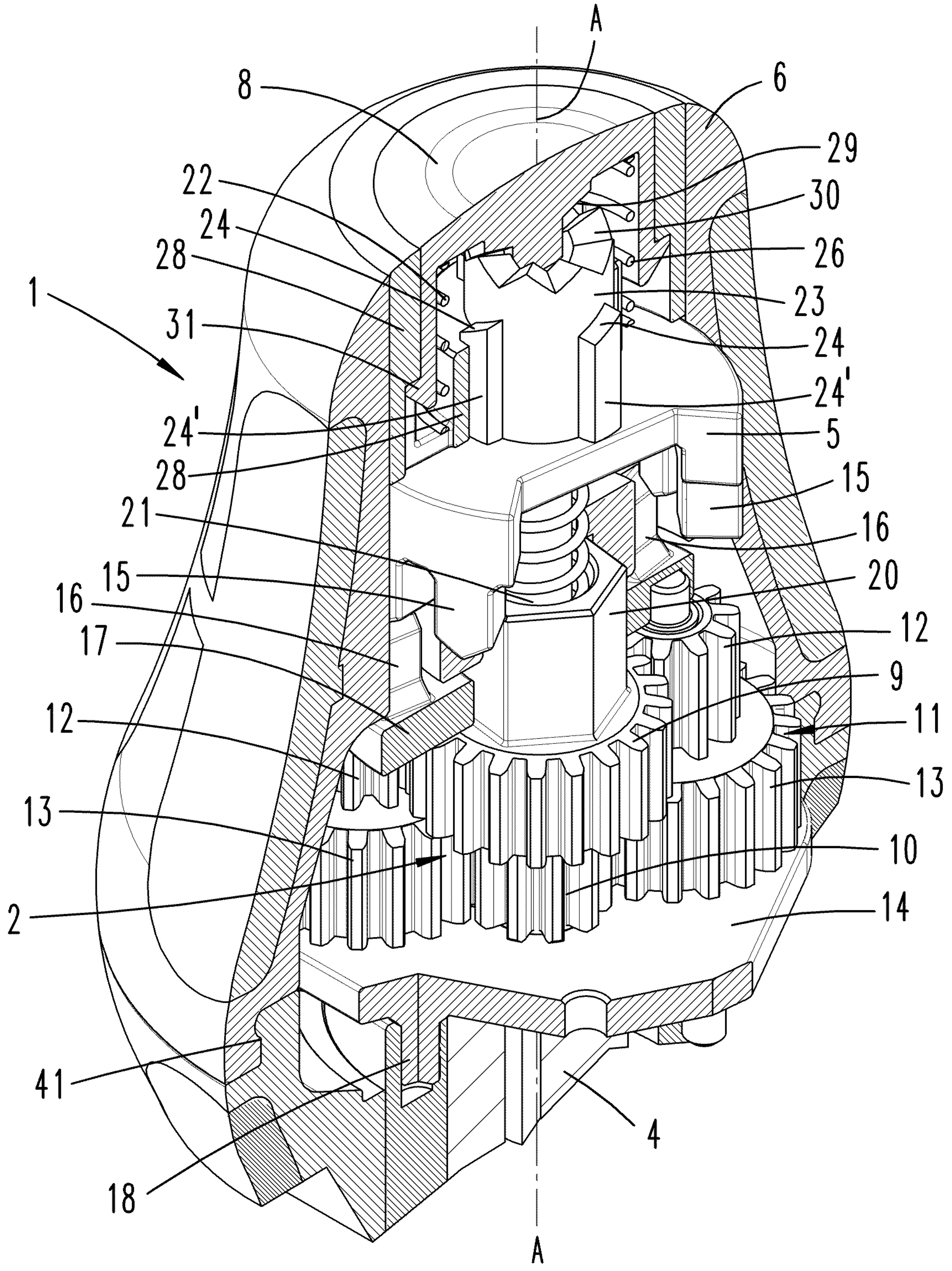
FIG. 4 shows a handle, which is sectioned along the sectional plane according to FIG. 2 and in which a toothing 15 of a blocking element 5 is not engaged with a mating toothing 16 of a ring body 17.
Figure 5:
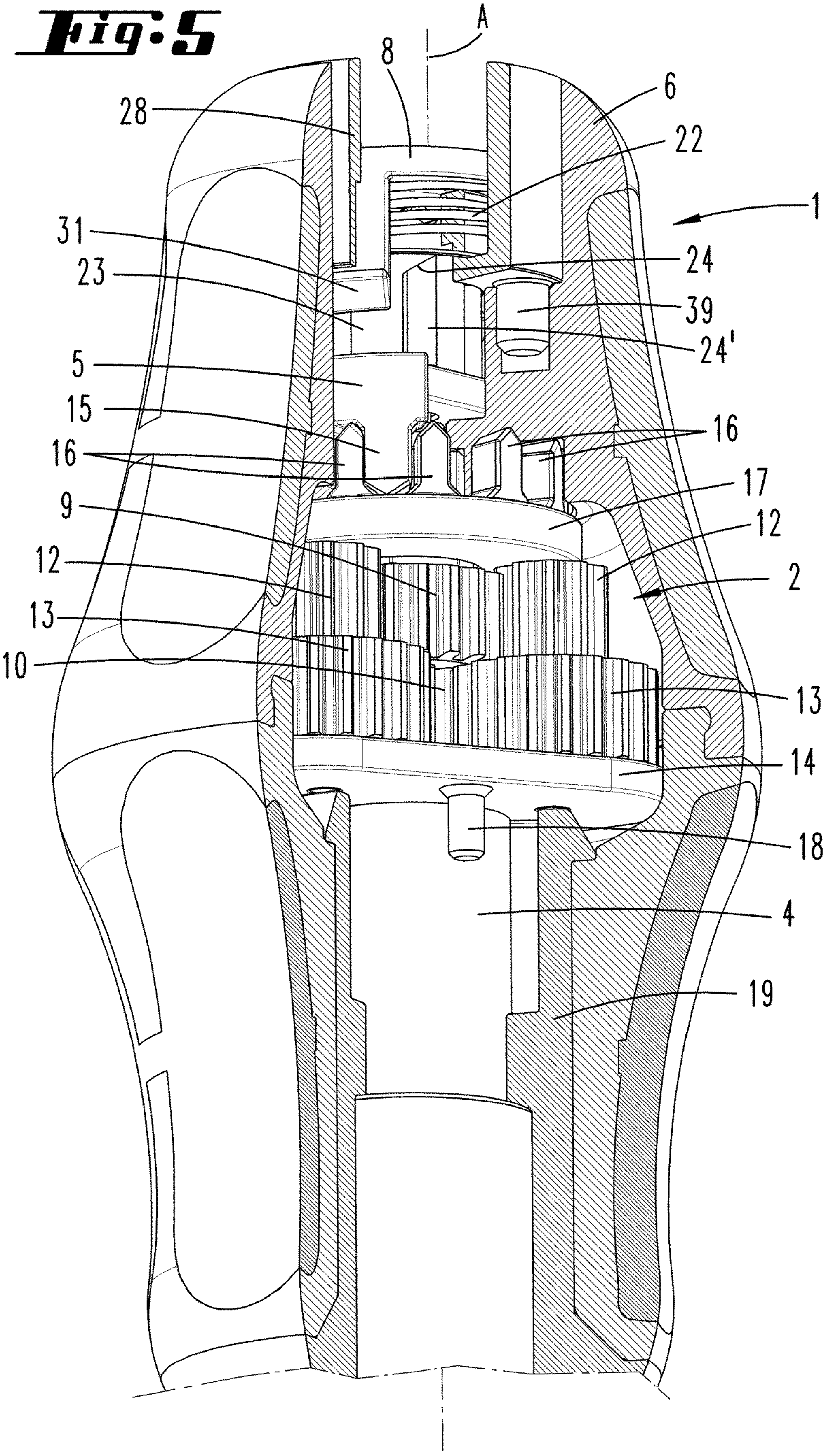
FIG. 5 shows a second perspective section, in which the toothing 15 is engaged with the mating toothing 16.

The screwdriver tool described in the exemplary embodiments has a handle 1 that consists of a first handle section 6 and a second handle section 7. The first handle section 6 consists of two handle section components 6', 6", which are connected to one another such that a separation joint 41 is formed. The separation joint 41 extends in the region of the handle section 6 with the largest diameter and surrounds a cavity.

The first handle section 6 forms a rounded face side with a face side opening 34, in which a crank piece 28 is inserted. A thrust piece 8, which can be displaced axially referred to an axis A, is located in the crank piece 28, wherein spring arms originate from said trust piece and have on their end hooks 31 that engage behind steps 32 of the crank piece 28.

A pushbutton spring 22 is supported on a base 33 of the crank piece 28 and acts upon the pushbutton 8 in the axial direction extending away from the crank piece 28 in the form of a pressure spring. Studs 39 for mounting the crank piece 28 on the first handle section 6 in a rotationally fixed manner may protrude from the underside of the crank piece 28 that lies opposite of the base 33.

The underside of the pushbutton 8 carries a switch toothing 29 that forms oblique flanks. This switch toothing 29 interacts with a mating switch toothing 30 of the switching element 23. The switching element 23 is an essentially cylindrical body that is guided in a base opening of the crank piece 28. Ribs 24' protrude from a cylinder surface wall of the switching element 23 in uniform circumferential distribution and form obliquely extending holding projections 24.

Holding shoulders 25 are located in the base 33 angularly offset to the guide grooves 27 and interact with the holding projections 24.

This pushbutton arrangement functions as follows: starting from an operating position, in which the mating switch toothing 30 abuts on the switch toothing 29, the switching element 23 can be displaced through the opening in the base 33 by means of a linear displacement of the pushbutton 8, wherein the ribs 24' are guided in the guide grooves 27. The oblique flanks of the switch toothing 29 and the mating switch toothing 30 are angularly offset relative to one another in such a way that a torque is exerted upon the switching element 23, wherein said torque causes the switching element 23 to carry out a rotation when the ribs 24' exit the guide grooves 27. As soon as the ribs 24' have exited the guide grooves 27, the switching element 23 rotates relative to the crank piece 28 and the pushbutton 8 such that the angular offset between the switch toothing 29 and the mating switch toothing 30 is canceled. After an axial return displacement of the pushbutton 8, the holding projections 24 move underneath the holding shoulders 25 such that the switching element is secured in a displaced position after the first actuation. Since the holding projections 24 and the holding shoulders 25 extend obliquely, the switching element 23 continues to rotate slightly during the return displacement.

Once the pushbutton 8 is released, it axially moves back into the starting position due to the force of the relaxing pushbutton spring 22, wherein the switch toothing 29 moves away from the mating switch toothing 30.

During a second actuation, the oblique flanks of the switch toothing 29 engage into the oblique flanks of the mating switch toothing 30 in such a way that a torque is once again exerted upon the switching element 23 in the same direction. The switch toothing 29 and the mating switch toothing 30 are also angularly offset relative to one another in this case. As a result, the switching element 23 can after a slight axial displacement continue to rotate into a position, in which the ribs 24' are aligned with the guide grooves 27, such that the switching element 23 can be once again displaced back into the starting position.

A blocking element 5, which is likewise arranged in the face side opening 34, is displaced in the direction of the axis A concomitant with the displacement of the switching element 23. The blocking element 5 is assigned to the first handle section 6 in a rotationally fixed manner and has a broad side toothing 15 consisting of multiple teeth. A blocking element spring 26 is provided and acts upon the blocking element 5 in the direction of the switching element 23 such that the blocking element spring 26 can generate the force required for moving the switching element from a displaced position back into the starting position in the above-described manner.

A transmission gearing 2 is located within the first handle section 6 and realized in the form of an epicyclic gearing in the exemplary embodiment. A web 14 and a ring body 17 form a cage that supports the axles 40 of multiple planetary wheels, namely three planetary wheels in the exemplary embodiment. Teeth protruding from the ring body 17 in the direction of the blocking element 5 form a mating toothing 16. The toothing 15 can be engaged with the mating toothing 16. The ring body 17, which is otherwise rotatable relative to the first handle section 6, is then secured on the first handle section 6.

The epicyclic gearing 2 has a large-diameter sun wheel 9, which is connected to the first handle section in a rotationally fixed manner by means of a polygonal section that forms a coupling section 20. To this end, the coupling section 20 is inserted into a fittingly shaped cavity 21 of the first handle section. The blocking element spring 26 can be supported on a face of the coupling section 20.

The planetary wheels 11 have small-diameter toothings 12 that mesh with the large-diameter sun wheel 9. The small-diameter toothings 12 are connected in a rotationally fixed manner to large-diameter toothings 13, which in turn mesh with a second small-diameter sun wheel 10. The large-diameter sun wheel 9 forms a driving wheel, which due to the planetary wheels 11 has a transmission ratio of 4:1 referred to the driven wheel formed by the small-diameter sun wheel.

The second handle section 7, which is rotatably assigned to the first handle section, has an extension 19 that protrudes into a cavity of the first handle section. In this case, the extension 19 can only extend into the handle section region 6" arranged between a handle section region 6' and the second handle section 7. It is secured at this location in an axially fixed yet rotatable manner by means of hooks 35. The extension 19 is connected to the cage carrying the planetary wheels 11 in a rotationally fixed manner. It is particularly connected in a rotationally fixed manner to the web 14 formed by a plate. To this end, pins 18 engage into the face side openings of the extension 19. However, extensions of the axles 40 may also engage into the openings instead of the pins 18.

A chuck 4 is located within the extension 19 and likewise secured within the second handle section 7 with the aid of locking means. A blade 3 can be inserted into the chuck 4. A driven axle 36, which is connected to the small-diameter sun wheel 10 in a rotationally fixed manner or forms the small-diameter sun wheel, forms a torque transmission section 37 that is inserted into a torque transmission opening of the chuck 4 and thereby able to transmit a torque to the chuck 4. A round section 38 of the driven axle 36 respectively penetrates the coupling section 20 and the large-diameter sun wheel 9 such that the large-diameter sun wheel 9 can rotate freely relative to the driven axle 36. The driven axle 36 furthermore supports the blocking element spring 26 and penetrates a central opening of the blocking element 5, wherein the driven axle protrudes as far as into a central opening of the switching element 23. An axial displaceability of the chuck 4 and the driven axle 36 connected thereto is not provided.

The screwdriver tool functions as follows: an angular velocity transmittable from the handle to the blade 3 in both rotating directions is in the release position, in which the toothing 15 of the blocking element 5 does not engage into the mating toothing 16, increased by the factor 4 when the first handle section 6 is rotated and the second handle section 7 is held firmly. The screwdriver tool can be used on live components because the steel core of the blade is with the exception of the working tip completely encased in an electrically insulating material and the chuck and the handle sections consist of an electrically insulating material. In the release position of the blocking element, the screwdriver tool assumes a quick-action screwing position, in which the screws can be screwed into a thread with high rotational speed. The screwdriver tool reaches a power screwing position once the blocking element 5 is displaced from the release position into the blocking position, in which the toothing 15 engages into the mating toothing 16. The switchover between the quick-action screwing position and the power screwing position is realized by means of a one-time actuation the pushbutton 8. In the power screwing position, the planetary wheel arrangement, i.e. the ring body 17 or the web 14, respectively is indirectly connected to the first handle section 6 in a rotationally fixed manner. As a result, the second handle section 7 is also connected to the first handle section 6 in a rotationally fixed manner. The screwdriver tool can be actuated like a conventional screwdriver in the blocking position. The torques can be transmitted to the blade 3 by means of the first handle section 6, as well as by means of the second handle section 7.

The preceding explanations serve for elucidating all inventions that are included in this application and respectively enhance the prior art independently with at least the following combinations of characteristics, wherein two, multiple or all of these combinations of characteristics may also be combined with one another, namely:

A screwdriver tool, which is characterized in that the locking means is a blocking element 5, which can be moved from a release position into a blocking position and in the blocking position secures the blade 3 or the chuck 4 to the handle 1 in a rotationally fixed manner.

A screwdriver tool, which is characterized in that the blocking element 5 can be displaced between the blocking position and the release position in the direction of an axis A, which extends in the extending direction of the handle 1 or the blade 3, and/or is displaceably arranged in a first handle section 6 that faces away from the blade 3 and/or can be displaced by an axially displaceable pushbutton 8, wherein it is particularly proposed that the pushbutton 8 displaces the blocking element 5 back and forth between the blocking position and the release position due to a respective axial displacement of itself against an elastic restoring force.

A screwdriver tool, which is characterized in that the reduction gearing is an epicyclic gearing 2, wherein it is particularly proposed that a large-diameter first toothed wheel, particularly a sun wheel 9, is connected to a first handle section 6 in a rotationally fixed manner and/or that a small-diameter third toothed wheel, particularly a sun wheel 10, is connected to the blade 3 in a rotationally fixed manner and/or that one or more second toothed wheels, particularly planetary wheels 11, have a small-diameter toothing 12, which meshes with the first toothed wheel, particularly the large sun wheel 9, and a large-diameter toothing 13, which meshes with the third toothed wheel, particularly the small sun wheel 10, and wherein it is particularly proposed that a web 14 carrying the axles 40 of the second toothed wheels, particularly the planetary wheels 11, is connected in a rotationally fixed manner to a second handle section 7, which is rotatable relative to the first handle section 6.

A screwdriver tool, which is characterized in that the blade 3 or the chuck 4 rotates upon a counterclockwise rotation and upon a clockwise rotation of the handle section 6, during which the second handle section 7 is held firmly, in the same rotating direction with at least double, preferably three-times and particularly about four-times, the rotational speed of the first handle section 6.

A screwdriver tool, which is characterized in that the blocking element 5, which is assigned to the first handle section 6 in a rotationally fixed manner, has a toothing 15 that comprises at least one tooth or one tooth space and in the blocking position engages with a mating toothing 16, which comprises at least one tooth space or one tooth and is assigned to a second handle section 7 that is rotatable relative to the first handle section 6 or to the web 14 of the reduction gearing 2 in a rotationally fixed manner, and wherein it is particularly proposed that a ring body 17, which forms the mating toothing 16, supports the axles of the second toothed wheels, particularly the planetary wheels 11.

A screwdriver tool, which is characterized in that the second handle section 7 supports the chuck receiving the blade 3, wherein said chuck and particularly also the two handle sections 6, 7 consist of an electrically insulating material, and/or in that the web 14, which is formed by a plate and carries multiple planetary wheels 11, is connected to an extension 19 of the second handle section 7, which protrudes into a cavity of the first handle section 6, by means of pins 18 and/or in that a coupling section 20, which is connected to the large-diameter sun wheel 9 in a rotationally fixed manner and particularly realized polygonally, engages into a fittingly shaped cavity 21 of the first handle section 6.

A screwdriver tool, which is characterized in that a pushbutton 8, which can be displaced against a restoring force of a pushbutton spring 22, displaces upon a first actuation the blocking element 5, which is acted upon by a spring from the blocking position in the direction of a release position, into its blocking position with a switching element 23 that can be axially displaced from a starting position, wherein holding means 24, 25 are provided and hold the switching element 23 in the position, in which it is displaced from the starting position, while holding the blocking element 5 in the blocking position.

A screwdriver tool, which is characterized in that the holding means 24, 25 are released from their holding position by means of a second actuation of the pushbutton 8 such that a blocking element spring 26, which displaces the blocking element 5 back into the release position, displaces the switching element 23 back into the starting position.

A screwdriver tool, which is characterized in that a switch toothing 29 of the pushbutton 8 has oblique flanks, which interact with flanks, particularly oblique flanks, of a mating switch toothing of the switching element 23 in order to exert a torque upon the switching element 23 during the axial displacement of the switching element 23 between the starting position and the displaced position, wherein the switching element 23 has ribs 24' that are guided in a guide groove 27 and form holding projections 24, which engage underneath holding shoulders 25 in an end phase of the displacement of the switching element 23 after a rotation of the switching element 23, and wherein the switch toothing 29 exerts upon a second actuation of the pushbutton 8 a torque upon the switching element 23 due to the oblique flank contact with the mating switch toothing 30 such that the switching element is after an axial displacement additionally rotated in such a way that the ribs 24' enter the guide grooves 27.

All disclosed characteristics are essential to the invention (individually, but also in combination with one another). The characteristics of the dependent claims also characterize independent inventive enhancements of the prior art without the characteristics of a claim to which they refer. The invention specified in each claim may additionally comprise one or more of the characteristics that were disclosed in the preceding description and, in particular, are identified by reference symbols and/or included in the list of reference symbols. The invention also concerns design variations, in which individual characteristics cited in the preceding description are not realized, particularly as far as they are obviously dispensable for the respective intended use or can be replaced with other, identically acting technical means.

The invention claimed is:

1. A screwdriver tool comprising:

a handle having a first handle section and a second handle section;

a pushbutton that is axially displaceable from a starting position against a restoring force of a pushbutton spring;

a transmission gearing, wherein the transmission gearing is arranged in the handle and is configured to multiply a rotation angle which is transmitted from the handle to a blade protruding from the handle or to a chuck for receiving a blade;

a blocking element, which is movable from a release position into a blocking position by means of the pushbutton;

wherein the blocking element in the blocking position secures the blade to the handle or the chuck to the handle in a rotationally fixed manner and is displaceable between the blocking position and the release position in a direction of an axis that extends along a length of the handle or along a length of the blade;

wherein the pushbutton, upon a first actuation, displaces the blocking element into the blocking position with a switching element that is axially displaceable from a starting position;

holding means configured to hold the switching element in the starting position, in which the switching element is displaced from the starting position, while holding the blocking element in the blocking position; and wherein the holding means are released from a holding position by means of a second actuation of the pushbutton.

2. The screwdriver tool of claim 1, wherein the pushbutton displaces the blocking element back and forth between the blocking position and the release position due to a respective axial displacement of the pushbutton against the restoring force of the pushbutton spring.

3. The screwdriver tool of claim 1, wherein the transmission gearing is arranged in the handle and comprises:

a first toothed wheel;

a plurality of second toothed wheels;

wherein the blocking element, which is assigned to the first handle section in a rotationally fixed manner, has a toothing that includes at least one tooth or tooth space and, while in the blocking position, engages with a mating toothing, wherein the mating toothing includes at least one tooth space or tooth and is assigned to the second handle section that is rotatable relative to the first section or to a web of the transmission gearing in a rotationally fixed manner, wherein a ring body, which forms the mating toothing, supports the axles of the second toothed wheels.

4. The screwdriver tool of claim 1, wherein the transmission gearing is an epicyclic gearing;

wherein the epicyclic gearing comprises a first wheel, a second wheel, and a third wheel.

5. The screwdriver tool of claim 4, wherein the first wheel is a first toothed wheel, and wherein the first wheel is connected to the first handle section in a rotationally fixed manner.

6. The screwdriver tool of claim 5, wherein the first toothed wheel is connected to the first handle section in a rotationally-fixed manner via a polygonal section that forms a coupling section;

wherein the coupling section engages into a cavity of the first handle section.

7. The screwdriver tool of claim 4, wherein the third wheel is a toothed wheel or a sun wheel, and wherein the third wheel is connected to the blade in a rotationally fixed manner.

8. The screwdriver tool of claim 4, comprising one or more second wheels;

wherein the first wheel is a first toothed wheel or a sun wheel;

wherein the one or more second wheels are second toothed wheels or planetary wheels;

wherein the third wheel is a third toothed wheel or a sun wheel;

wherein the one or more second wheels have first toothing which meshes with the first wheel and second toothing which meshes with the third wheel, the first toothing have a diameter smaller than a diameter of the second toothing.

9. The screwdriver tool of claim 8, wherein a web, which carries axles of the one or more second wheels, is connected in a rotationally fixed manner to the second handle section; and wherein the second handle section is rotatable relative to the first handle section.

10. The screwdriver tool of claim 4, wherein a web is connected to an extension of the second handle section by means of pins, wherein the second handle section protrudes into a cavity of the first handle section, and wherein the web is formed by a plate and carries multiple planetary wheels.

11. The screwdriver tool of claim 1, wherein the blade or the chuck rotates upon a rotation of the first handle section, relative to the second handle section in the same rotating direction with at least double, three-times or at least four-times the rotational speed of the first handle section.

12. The screwdriver tool of claim 1, wherein the second handle section supports the chuck receiving the blade, wherein said chuck and the first handle section and the second handle section each comprise an electrically insulating material.

13. The screwdriver tool of claim 1, wherein a blocking spring, which displaces the blocking element back into the release position, displaces the switching element back into the starting position.

14. The screwdriver tool of claim 1, wherein a switch toothing of the pushbutton has oblique flanks, which interact with flanks or oblique flanks of a mating switch toothing of the switching element to exert a torque upon the switching element during axial displacement of the switching element between the starting position and the displaced position, wherein the switching element has ribs that are guided in one or more guide grooves and form holding projections, wherein the ribs engage underneath holding shoulders in an end phase of the displacement of the switching element after a rotation of the switching element, wherein upon a second actuation of the pushbutton, the switch toothing exerts a torque upon the switching element due to contact of the oblique flanks with the mating switch toothing, wherein the torque exerted by the switch toothing upon the switching element is such that the switching element after an axial displacement is additionally rotated in such a way that the ribs enter the guide grooves.

15. A screwdriver tool, comprising:

a transmission gearing having a first toothed wheel and a second toothed wheel;

the transmission gearing being arranged in a handle;

the handle including a first handle section and a second handle section, the second handle section being rotatable relative to the first handle section;

the transmission gearing being configured to multiply a rotation angle transmitted from the handle to a blade protruding from the handle or to a chuck for receiving a blade;

a blocking element that is movable from a release position into a blocking position, wherein the blocking element in the blocking position secures the blade or the chuck to the handle in a rotationally fixed manner;

wherein the blocking element, which is assigned to the first handle section in a rotationally fixed manner, has a toothing that includes at least one tooth or tooth space and wherein in the blocking position, the toothing of the blocking element engages with a mating toothing;

wherein the mating toothing includes at least one tooth space or tooth and is assigned to the second handle section or to a web of the transmission gearing in a rotationally fixed manner;

wherein a ring body, which forms the mating toothing, supports axles of the second toothed wheels, wherein the blocking element is displaceable into the blocking position via a pushbutton against a restoring force of a blocking element spring that acts upon the blocking element in the direction of the release position, the pushbutton being arranged in a face side opening of the first handle section.

* * * * *